United States Patent
Khan (10) Patent No.: US 12,468,622 B1
(45) Date of Patent: Nov. 11, 2025

(54) SYSTEM AND METHOD OF TEST CASE PROCESSING FRAMEWORK

(71) Applicant: Blue Yonder Group, Inc., Scottsdale, AZ (US)

(72) Inventor: Samim Khan, Hyderabad (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 279 days.

(21) Appl. No.: 16/559,036

(22) Filed: Sep. 3, 2019

Related U.S. Application Data (60) Provisional application No. 62/786,625, filed on Dec. 31, 2018.

(51) Int. Cl.
  *G06F 11/3668* (2025.01)
  *G06F 16/957* (2019.01)
  *G06F 40/205* (2020.01)

(52) U.S. Cl.
  CPC ...... *G06F 11/3684* (2013.01); *G06F 11/3688* (2013.01); *G06F 16/9577* (2019.01); *G06F 40/205* (2020.01)

(58) Field of Classification Search
  CPC ............ G06F 11/3684; G06F 16/9577; G06F 40/205; G06F 11/3688
  USPC ......................................................... 714/38
  See application file for complete search history.

(56) References Cited

U.S. PATENT DOCUMENTS

| | | | | |
|---|---|---|---|---|
| 10,776,434 | B1* | 9/2020 | Blackman | G06F 16/3344 |
| 2003/0217052 | A1* | 11/2003 | Rubenczyk | G06F 16/951 |
| 2009/0100345 | A1* | 4/2009 | Miller | G06F 40/143 |
| | | | | 715/738 |
| 2011/0289356 | A1* | 11/2011 | Hossain | G06F 11/3672 |
| | | | | 714/38.1 |
| 2013/0036108 | A1* | 2/2013 | Corbeau | G06F 16/958 |
| | | | | 707/769 |
| 2014/0250426 | A1* | 9/2014 | Wang | G06F 11/3668 |
| | | | | 717/124 |
| 2014/0344232 | A1* | 11/2014 | Kludy | G06F 40/174 |
| | | | | 707/694 |
| 2015/0006519 | A1* | 1/2015 | Jain | G06F 40/30 |
| | | | | 707/723 |
| 2017/0286525 | A1* | 10/2017 | Li | G06N 20/00 |

* cited by examiner

*Primary Examiner* — Hope C Sheffield
(74) *Attorney, Agent, or Firm* — Spencer Fane LLP; Steven J. Laureanti (57) ABSTRACT

A system and method are disclosed of automatically generating test cases for automation testing. Embodiments include receiving input data written in plain text as input from one or more users, the input data comprising one or more sentences, extracting one or more sentences and storing each sentence into an array of a database, extracting parameters and instructions from the sentences, determining if there are regular expressions of the input data and actions to be performed on a browser stored in the database and matching the regular expressions with the actions.

11 Claims, 4 Drawing Sheets

SYSTEM AND METHOD OF TEST CASE PROCESSING FRAMEWORK

CROSS-REFERENCE TO RELATED APPLICATIONS

The present disclosure is related to that disclosed in the U.S. Provisional Application No. 62/786,625, filed Dec. 31, 2018, entitled "System and Method of Test case Processing Framework." U.S. Provisional Application No. 62/786,625 is assigned to the assignee of the present application. The subject matter disclosed in U.S. Provisional Application No. 62/786,625 is hereby incorporated by reference into the present disclosure as if fully set forth herein. The present invention hereby claims priority under 35 U.S.C. § 119 (e) to U.S. Provisional Application No. 62/786,625.

TECHNICAL FIELD

The present disclosure relates generally to a system and method of a test case processing framework and specifically to automated testing actions and functional calls.

BACKGROUND

In supply chains, the various supply chain processes are controlled by different systems, spread over many locations and built on different computing platforms. Testing of systems is done by many different tools, each only able to test a small number of systems, so that each tool may do some types of testing, but not all. Each tool has a different setup process, architecture, and test case syntax, which must be learned by users. Additionally, testing tools require frequent modification of test cases, each only useable until changes to the tested system render the test case nonfunctional. Therefore, current testing tools require too much user training and resources, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide for automatically generating test cases from plain language textual inputs, such as, for example, plain English sentences describing actions to be performed on one or more applications or webpages during automation testing.

Figure 1:
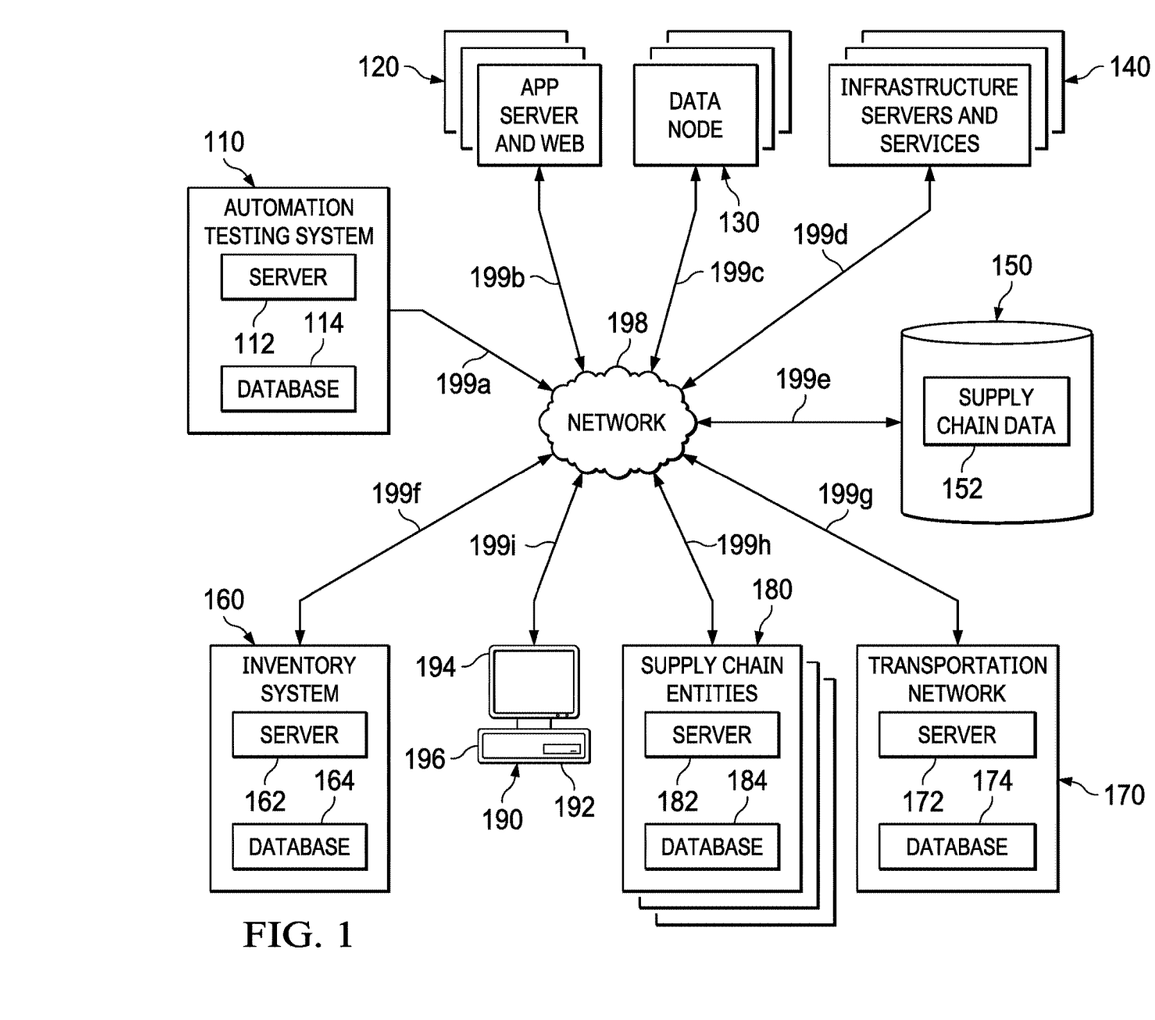
FIG. 1 illustrates an exemplary distributed supply chain network, in accordance with a first embodiment.

FIG. 1 illustrates exemplary distributed supply chain network 100, in accordance with a first embodiment. Distributed supply chain network 100 comprises automation testing system 110, one or more application and/or web servers 120, one or more data nodes 130, one or more infrastructure servers and services 140, database 150, inventory system 160, transportation network 170, one or more supply chain entities 180, computer 190, network 198, and communication links 199a-199i. Although automation testing system 110, one or more application and/or web servers 120, one or more data nodes 130, one or more infrastructure servers and services 140, a single database 150, a single inventory system 160, a single transportation network 170, one or more supply chain entities 180, a single computer 190, a single network 198, and one or more communication links 199a-199i are shown and described, embodiments contemplate any number of automation testing systems, application and/or web servers, data nodes, infrastructure servers and services, databases, inventory systems, transportation networks, supply chain entities, computers, networks, and communication links, according to particular needs.

Automation testing system 110 comprises server 112 and database 114. Server 112 of automation testing system 110 comprises one or more processors and modules that support automation testing tools that may automate test cases for programs and webpages and generate detailed reports. As described in greater detail herein, automation testing system 110 comprises one or more tools that generate test cases from plain text input by converting the text, such as, for example, plain English text, into corresponding function calls and/or actions to be performed on an application or within a web browser. For example, automation testing system 110 may perform regression testing using automation tools that automatically perform actions or function calls described in a test case on a targeted application or web browser. By comparing the testing results with the expected results, a determination is made whether the application or website is working properly. Programming errors may be solved by testing various solutions until the actual and expected results align. Automation testing system 110 may also perform performance testing to, for example, determine the responsiveness and stability of a system under a particular workload. Performance testing may also serve to investigate, measure, validate, or verify other quality attributes of the system, such as scalability, reliability, and resource usage.

Automation testing system comprises graphical user interface 228 (FIG. 2) providing for adding, removing, or modifying expressions and keywords 244 that invoke particular actions having specified parameters 238. In one embodiment, automation testing system 110 parses the text input for regular expressions 242, keywords 244, and parameters 238, and based on matches within an action repository, provides a particular action or function call, as explained in more detail below. In addition, a set of regular expressions 242 may be associated with one or more keywords 244 or instructions 236 that configure the target, timing, input, location, or other configuration of the action or function.

Although automation testing system 110 is described in connection with supply chain systems and programs, embodiments contemplate regression and performance testing for applications including workforce management, assortment planning, allocation planning, order promising, enterprise simulation planning, sales and operation planning, order optimization, inventory optimization, demand planning, flow casting, order fulfillment, dispatching and transportation management. Additionally, automation testing system 110 is industry-agnostic and may perform automation testing in any industry. Automation testing system 110 may comprise one or more modules that support processes to perform testing on one or more programs of one or more application and/or web servers 120 and is capable of storing, receiving, processing, communicating, and modifying data stored at one or more data nodes 130 or database 150.

According to embodiments, one or more application and/or web servers 120 store, receive, process, communicate, and modify data at one or more data nodes 130 and/or database 150. One or more application and/or web servers 120 host applications that support one or more supply chain processes, including, for example, supply chain management, inventory optimization, or retail, manufacturing, enterprise, or utility planning. In addition, one or more data nodes 130 and database 150 may comprise any physical or virtual server, and any supporting hardware or software, supporting the storage of data at one or more locations local to, or remote from, automation testing system 110 and one or more application and/or web servers 120.

Database 150 comprises one or more databases or other data storage arrangements at one or more locations, local to, or remote from, automation testing system 110, one or more application and/or web servers 120, one or more data nodes 130, supply chain entities 180, and computer 190. Supply chain data 152 may comprise, for example, metadata, which is comprised of dimensions, hierarchies, levels, members, attributes, and member attribute values, and fact data, comprising measure values for combinations of members. Data stored in database 150 may be, for example, various decision variables, business constraints, goals, and objectives of supply chain entities 180. According to some embodiments, supply chain data 152 may comprise hierarchical objectives specified by, for example, business rules, master planning requirements along with scheduling constraints and discrete constraints, such as, for example, sequence dependent setup times, lot-sizing, storage, shelf life, and other like constraints.

Inventory system 160 may comprise server 162 and database 164. Server 162 of inventory system 160 may be configured to receive and transmit item data, including item identifiers, pricing data, attribute data, inventory levels, and other like data about one or more items at one or more locations in distributed supply chain network 100. According to embodiments, server 162 stores and retrieves item data from database 164 of inventory system 160, database 150, or one or more locations in distributed supply chain network 100.

Transportation network 140 may comprise server 142 and database 144. According to embodiments, transportation network 140 directs one or more transportation vehicles 146 to ship one or more items between one or more supply chain entities 150 at least partially based on an inventory policy, target service levels, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with supply chain planner 110, one or more imaging devices 120, inventory system 130, transportation network 140, and one or more supply chain entities 150 to identify the location of transportation vehicle 146 and the location of any inventory or shipment located on transportation vehicle 146. According to embodiments, transportation vehicles may be associated with one or more suppliers, manufacturers, distributors, or retailers, or another supply chain entity, according to particular needs and be directed by automated navigation including GPS guidance.

As shown in FIG. 1, distributed supply chain network 100 comprising automation testing system 110, one or more application and/or web servers 120, one or more data nodes 130, one or more infrastructure servers and services 140, database 150, inventory system 160, transportation network 170, supply chain entities 180, computer 190, network 198, and communication links 199*a*-199*i* may operate on one or more computers that are integral to or separate from the hardware and/or software that support automation testing system 110, one or more application and/or web servers 120, one or more data nodes 130, one or more infrastructure servers and services 140, database 150, inventory system 160, transportation network 170, supply chain entities 180, computer 190, network 198, and communication links 199*a*-199*i*. Computer 190 may include any suitable input device 192, such as a keypad, mouse, touch screen, microphone, or other device to input information. Output device 194 may convey information associated with the operation of distributed supply chain network 100, including digital or analog data, visual information, or audio information.

Computer 190 may include fixed or removable computer-readable storage media, including a non-transitory computer readable medium, magnetic computer disks, flash drives, CD-ROM, in-memory device or other suitable media to receive output from and provide input to distributed supply chain network 100. Computer 190 may include one or more processors 196 and associated memory to execute instructions and manipulate information according to the operation of the distributed supply chain network 100 and any of the methods described herein. In addition, or as an alternative, embodiments contemplate executing the instructions on computer 190 that cause computer 190 to perform functions of the method. Further examples may also include articles of manufacture including tangible non-transitory computer-readable media that have computer-readable instructions encoded thereon, and the instructions may comprise instructions to perform functions of the methods described herein.

Automation testing system 110, one or more application and/or web servers 120, one or more data nodes 130, one or more infrastructure servers and services 140, database 150, inventory system 160, transportation network 170, and supply chain entities 180 may each operate on one or more separate computers, a network of one or more separate or collective computers, or may operate on one or more shared computers. In addition, distributed supply chain network 100 may comprise a cloud-based computing system having processing and storage devices at one or more locations, local to, or remote from automation testing server, one or more application and/or web servers 120, one or more data nodes 130, one or more infrastructure servers and services 140, database 150, inventory system 160, transportation network 170, and supply chain entities 180. In addition, each of the one or more computers 190 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with automation testing system 110, one or more application and/or web servers 120, one or more data nodes 130, one or more infrastructure servers and services 140, database 150, inventory system 160, transportation network 170, and supply chain entities 180. These one or more users may include, for example, a "manager" or a "planner" handling automated application testing and/or one or more related tasks within distributed supply chain network 100. These one or more users within the system may include, for example, one or more computers programmed to autonomously handle, among other things, automation testing, creating one or more testing tool controls, and/or one or more related tasks within the automation testing system. In addition, or as an alternative, these one or more users within distributed supply chain network 100 may include, for example, one or more computers programmed to autonomously handle, among other things, production planning, demand planning, option planning, sales and operations planning, order placement, automated warehouse operations (including removing items from and placing items in inventory), robotic production machinery (including building or items), and/or one or more related tasks within distributed supply chain network 100.

One or more supply chain entities 180 may comprise server 182 and database 184. One or more supply chain entities 180 represent one or more suppliers, manufacturers, distributors, and retailers in one or more supply chain networks, including one or more enterprises.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another one or more supply chain entities 180, such as a supplier, an item that needs further processing, or any other item. A manufacturer may, for example, produce and sell a product to a supplier, another manufacturer, a distributor, a retailer, a customer, or any other suitable person or an entity. Such manufacturers may comprise automated robotic production machinery that produce products based, at least in part, on a supply chain plan, a material or capacity reallocation, current and projected inventory levels, and/or one or more additional factors described herein.

One or more suppliers may be any suitable entity that offers to sell or otherwise provides one or more components to one or more manufacturers. Suppliers may comprise automated distribution systems that automatically transport products to one or more manufacturers based, at least in part, on a supply chain plan, a material or capacity reallocation, current and projected inventory levels, and/or one or more additional factors described herein.

One or more distributors may be any suitable entity that offers to sell, warehouse, transport, or distribute at least one product to one or more retailers and/or customers. Distributors may, for example, receive a product from a first supply chain entity in distributed supply chain network 100 and store and transport the product for a second supply chain entity. Such distributors may comprise automated warehousing systems that automatically transport to one or more retailers or customers and/or automatically remove from or place into inventory products based, based, at least in part, on a supply chain plan, a material or capacity reallocation, current and projected inventory levels, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more suppliers, manufacturers, distributors, and retailers are shown and described as separate and distinct entities, the same entity may simultaneously act as any one or more suppliers, manufacturers, distributors, and retailers. For example, one or more supply chain entities 180 acting as a manufacturer could produce a product, and the same entity could act as a supplier to supply a product to another one or more supply chain entities 180. Although one example of distributed supply chain network 100 is shown and described; embodiments contemplate any configuration of distributed supply chain network 100, without departing from the scope of the present disclosure.

In one embodiment, automation testing system 110 may be coupled with network 198 using communications link 199*a*, which may be any wireline, wireless, or other link suitable to support data communications between automation testing system 110 and network 198 during operation of distributed supply chain network 100. One or more application and/or web servers 120 may be coupled with network 198 using communications link 199*b*, which may be any wireline, wireless, or other link suitable to support data communications between one or more application and/or web servers 120 and network 198 during operation of distributed supply chain network 100. One or more data nodes 130 may be coupled with network 198 using communications link 199*c*, which may be any wireline, wireless, or other link suitable to support data communications between one or more data nodes 130 and network 198 during operation of distributed supply chain network 100. One or more infrastructure servers and services 140 may be coupled with network 198 using communications link 199*d*, which may be any wireline, wireless, or other link suitable to support data communications between one or more infrastructure servers and services 140 and network 198 during operation of distributed supply chain network 100. Database 150 may be coupled with network 198 using communications link 199e, which may be any wireline, wireless, or other link suitable to support data communications between database 150 and network 198 during operation of distributed supply chain network 100. Inventory system 160 may be coupled with network 198 using communications link 199f, which may be any wireline, wireless, or other link suitable to support data communications between inventory system 160 and network 198 during operation of distributed supply chain network 100. Transportation networks may be coupled with network 198 using communications link 199g, which may be any wireline, wireless, or other link suitable to support data communications between transportation networks and network 198 during operation of distributed supply chain network 100. One or more computers may be coupled with network 198 using communications link 199h, which may be any wireline, wireless, or other link suitable to support data communications between the one or more computers and network 198 during operation of distributed supply chain network 100. One or more supply chain entities 180 may be coupled with network 198 using communications link 199i, which may be any wireline, wireless, or other link suitable to support data communications between one or more supply chain entities 180 and network 198 during operation of distributed supply chain network 100.

Although communication links 199a-199i are shown as generally coupling automation testing system 110, one or more application and/or web servers 120, one or more data nodes 130, one or more infrastructure servers and services 140, database 150, inventory system 160, transportation network 170, one or more supply chain entities 180, and computer 190 to network 198, each of automation testing system 110, one or more application and/or web servers 120, one or more data nodes 130, one or more infrastructure servers and services 140, database 150, inventory system 160, transportation network 170, one or more supply chain entities 180, and computer 190 may communicate directly with each other, according to particular needs.

In another embodiment, network 198 includes the Internet and any appropriate local area networks (LANs), metropolitan area networks (MANs), or wide area networks (WANs) coupling automation testing system 110, one or more application and/or web servers 120, one or more data nodes 130, one or more infrastructure servers and services 140, database 150, inventory system 160, transportation network 170, one or more supply chain entities 180, and computer 190. For example, data may be maintained by locally or externally of automation testing system 110, one or more application and/or web servers 120, one or more data nodes 130, one or more infrastructure servers and services 140, database 150, inventory system 160, transportation network 170, one or more supply chain entities 180, and computer 190 and made available to one or more associated users of automation testing system 110, one or more application and/or web servers 120, one or more data nodes 130, one or more infrastructure servers and services 140, database 150, inventory system 160, transportation network 170, one or more supply chain entities 180, and computer 190 using network 198 or in any other appropriate manner. For example, data may be maintained in a cloud database at one or more locations external to automation testing system 110, one or more application and/or web servers 120, one or more data nodes 130, one or more infrastructure servers and services 140, database 150, inventory system 160, transportation network 170, one or more supply chain entities 180, and computer 190 and made available to one or more associated users of automation testing system 110, one or more application and/or web servers 120, one or more data nodes 130, one or more infrastructure servers and services 140, database 150, inventory system 160, transportation network 170, one or more supply chain entities 180, and computer 190 using the cloud or in any other appropriate manner. Those skilled in the art will recognize that the complete structure and operation of network 198 and other components within distributed supply chain network 100 are not depicted or described. Embodiments may be employed in conjunction with known communications networks and other components.

In accordance with the principles of embodiments described herein, applications supported by one or more application and/or web servers 120 may reallocate inventory of one or more items among demands and/or orders of one or more supply chain entities 180. Furthermore, applications supported by one or more application and/or web servers 120 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 180, and the configuration and quantity of packaging and shipping of items based on current inventory or production levels. For example, methods described herein may include computers 190 receiving product data from automated machinery having at least one sensor and the product data corresponding to an item detected by the automated machinery. The received product data may include an image of the item, an identifier, as described above, and/or other product data associated with the item (dimensions, texture, estimated weight, and any other like data). The method may further include computers 190 looking up the received product data in a database system associated with applications supported by one or more application and/or web servers 120 to identify the item corresponding to the product data received from the automated machinery.

Computers 190 may also receive from the automated machinery, a current location of the identified item. Based on the identification of the item, computers may also identify (or alternatively generate) a first mapping in distributed supply chain network 110, where the first mapping is associated with the current location of the identified item. Computers may also identify a second mapping in distributed supply chain network 110, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate items to add to or remove from an inventory of one or more supply chain entities.

Figure 2:
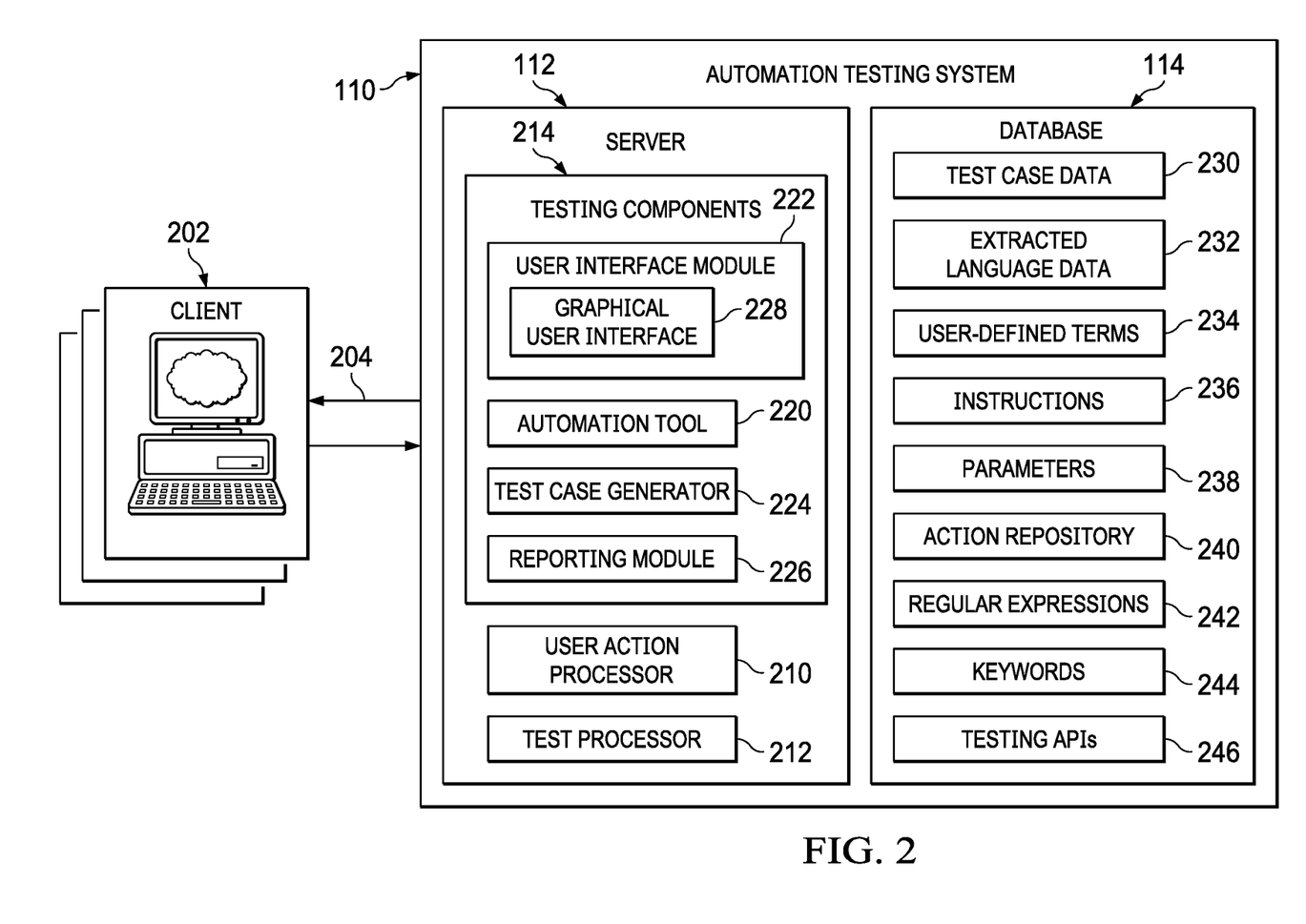
FIG. 2 illustrates the automation testing system of FIG. 1 in greater detail, in accordance with an embodiment.

FIG. 2 illustrates the automation testing system 110 of FIG. 1 in greater detail, in accordance with an embodiment. Automation testing system 110 comprises server 112 and database 114. According to an embodiment, automation testing system 110 is communicatively coupled with and one or more client computers 202. Automation testing system 110 communicates with one or more client computers 202 using communication links 220, which may be any wireline, wireless, or other link suitable to support data communications between automation testing system 110, one or more clients 202, and network 198 during operation of distributed supply chain network 100. As described above, application and/or web server 120 may be accessed by one or more clients 202. Clients 202 may provide access to application and/or web servers 120 hosting systems that control and operate one or more supply chain network processes including, for example, supply chain planning and optimization (SCPO), transportation management systems (TMS), warehouse management systems (WMS), workforce management (WFMR), and the like. In addition, client 202 may provide access and testing of cloud-based applications using automation testing system 110.

Server 112 of automation testing system 110 may comprise user action processor 210, test processor 212, and testing components 214.

As described in more detail below, user action processor 210 receives and processes a user input, determines actions and function calls described by the user input, calls test processor 212, and calculates testing results. Test processor 206 may receive and process test case files and invoke one or more testing components 208. Testing components 214 of automation testing system 110 may comprise automation tool 220, user interface 222, test case generator 224, and reporting module 226. Based on the identified action type for the user actions, test processor 212 calls the appropriate testing component 214 that support testing one or more actions of an application or system. According to one example, test processor 212 may call testing Application Processing Interfaces (APIs) 246 associated with automation tool 220 based, at least in part, instructions 236 and parameters 238 parsed from the textual input and matched with expressions, keywords 244, and allowed parameters 238, identified in the action repository. As described in further detail herein, test case generator 224 generates test cases by parsing sentences written in plain language to extract instructions 236 and parameters 238 which are matched with actions and/or function calls for testing a webpage or application.

Test processor 206 may invoke one or more of testing components 214 for testing one or more applications or webpages by calling one or more testing APIs 246 that execute one or more processes of application and webpage testing components 214. According to some embodiments, test processor 212 executes the test cases.

According to an embodiment, automation tool 220 may be invoked by test processor 212 to perform a particular action based on the matched expressions, keywords 244, and allowed parameters 238, identified in the action repository. By way of an example of regression analysis, an application may comprise an OS-based application (such as, for example, a WINDOWS-based application) that receives data entry by a MICROSOFT EXCEL spreadsheet. A test case for this type of application will include actions, such as, for example, open database worksheet, type in data, put data into the first row, or other like user actions. Automation tool 220 may invoke test processor 212 to perform a particular action based on the matched expressions, keywords 244, and allowed parameters 238, identified in the action repository. Continuing with this example, test processor 212 may call one or more appropriate testing components 214, which, in this example, may comprise automation tool 220. By way of a further example, automation tool 220 performs actions using different Internet browsers on which testing may be executed and also may execute multiple threads for each test.

User interface module 222 provides a user interface, such as, for example, graphical user interface 228, through which users can initiate supported actions including, for example, uploading and downloading test case files and initiate testing for a selected product and customer. Additionally, user interface module 222 may provide for selecting the number of threads to execute for each test. An end user may select any suitable Internet browser or application to run regression or performance test cases and the number of threads to be used. Furthermore, embodiments of a user interface generated by user interface module 222 contemplate providing test case execution on multiple servers with one request and, in addition, providing an administration console for solution setup.

According to embodiments, test case generator 224 receives and processes instructions 236 and parameters 238 written as plain English text to generate the corresponding function calls and/or actions. By using plain text input to represent instructions 236 and parameters 238, test case generator 224 may directly process the text input to generate test cases for automation testing. This eliminates, among other things, the need to separately maintain and write automation test cases. In addition, embodiments provide for a training mode, such that test case generator 224 is trained for new and/or complex instructions 236 and parameters 238. According to an embodiment, parameters 238 (such as, for example, field names, field values, and/or the like) may be identified by enclosure with single or double quotes. In other embodiments, parameters 238 may be designated using other symbols, text, or the like, according to particular needs.

After regression or performance testing using test cases generated by test case generator 224, reporting module 226 of automation testing system 110 may display results and reports of the test cases executed during testing. After a test case execution is finished, an alert overlay window may display a message indicating that the testing is completed and a report may be transmitted in any suitable format of any suitable file type (such as, for example, PDF, text documents, spreadsheets, or the like) through email, instant messaging, uploading to a network location, or the like. After receiving the report, the results may be compared with the expected results. The report may indicate, for example, failed test cases, at which step the test case failed, and a reason for the failure. If the report indicates that one or more errors occurred, the code for the tested application or website may be altered to correct for the errors. After the code is altered, the test case may be run again to look for further errors. This repetition of running the test case and fixing any error that occurs may be repeated as many times as necessary to remove all of the errors from the tested application or website.

According to embodiments, database 114 of automation testing system 110 comprises test case data 230, extracted language data 232, user-defined terms 234, instructions 236, parameters 238, action repository 240, regular expressions 242, keywords 244, and testing APIs 246. Although database 114 is described as comprising test case data 230, extracted language data 232, user-defined terms 234, instructions 236, parameters 238, action repository 240, regular expressions 242, keywords 244, and testing APIs 246, embodiments contemplate any suitable arrangement of data at one more locations local to, or remote from, automation testing system 110.

Test case data 230 of database 114 may comprise a file or input comprising plain language text which test case generator 224 parses to extract language for instructions 236, parameters 238, and keywords 244. Additionally, embodiments contemplate test case data 230 comprising stored test cases that have been previously parsed to generate actions or function calls on applications or webpages, as explained in more detail below.

Extracted language data 232 of database 114 may comprise an array or other data storage structure that extracts each sentence from the plain language text input. For example, according to one embodiment, each sentence of the plain language input may identify a single action, one or more instructions 236, one or more parameters 238, and/or one or more keywords 244 which are matched with information stored in the action repository. In addition, user-defined terms 234 of database 114 may comprise acronyms, abbreviations, or other text inputs that may be user-defined, according to particular needs.

Instructions 236 of database 114 may comprise modifications to one or more system actions, which are based on regular expressions 242 and/or keywords 244. By way of example and not by way of limitation, an exemplary test case may comprise the sentence, "Select 'second' row from the table where column "Shipment ID" is "T0001". Continuing with this example, 'second' may comprise the instruction that indicates that the action (e.g. "Select row") should be performed on the second row. However, when no instructions 236 are provided, test case generator 224 may perform a default action, such as, for example, selecting the first row. Embodiments contemplate providing more than one instructions 236 associated with any one or more actions.

Parameters 238 of database 114 may comprise field names, field values, and/or any keywords 244 provided by a user which may be used by an action executed in a test case.

Action repository 240 of database 114 may store, for each action, one or more regular expressions 242, keywords 244, parameters 238 which are associated with that action. According to embodiments, each action comprises one or more operations or browser actions, such as, for example, "clicking on an element," "getting text of an element," "matching a table row," "performing database operations" and the like. In addition, or as an alternative, each action may comprise a set of regular expressions 242, keywords 244 and/or parameters 238. Regular expressions 242 of database 114 may comprise an expression of an action identified by test case generator 224 and which may be defined by a user. By way of example only and not by way of limitation, an exemplary action may comprise a 'navigateMenu' action, which is expressed by the following set of regular expressions 242: "click (.*) menu (.*)", "navigate (.*) menu (.*)"," browse (.*) menu (.*)" When test case generator 224 receives a sentence in a test case such as, for example, "Navigate the following menu items "Shipments→Create Shipment" or "Browse "Shipments→Create Shipment" menu items ", test case generator 224 may match the text of the sentences with one or more regular expressions 242. Continuing with this example, test case generator 224 may match "navigate (.*) menu (.*)" and/or "browse (.*) menu (.*) from the text then check whether the number of parameters given in the test case match those defined in the action 'navigateMenu', and when both match test case generator 224 calls the action 'navigateMenu'.

Keywords 244 of database 114 may comprise an expression comprising a single word, and which is not also a regular expression. According to one embodiment, instead of a set of regular expressions 242 an action may be associated with a single keyword, such as, for example, associating a keyword 'menu' with an action to be performed on the menu. When test case generator 224 identifies the text 'menu" in a test case, the text generator 224 will perform the action associated with the 'menu' keyword. According to embodiments, keywords 244 may be designated using text, symbols (such as, for example, enclosure by single or double quotes), and/or the like, according to particular needs.

In addition, or as an alternative, action repository 240 comprises a data structure having associated each action with one or more regular expressions 242, keywords 244, and parameters 238, as illustrated below.

According to embodiments, user interface module 222 provides test case generator 224 with a graphical user interface, such that a user of the system may add or remove regular expressions 242, which based on a matching expression stored in actions repository, identify, at least in part, an action or function performed by test case generator 224. In addition, each action may have one or more keywords 244 and/or one or more regular expressions 242 that match instructions 236 from a test case file. The instructions 236 provide additional information to the function for processing.

According to embodiments, the below table is an example of an action for validating a text of a button located in the Hypertext Markup Language (HTML) of a browser page and declares the following expressions and instructions 236:

TABLE 1

| Number of Parameters 238 | Name, value Instructions 236 | |
|---|---|---|
| Regular expressions 242 | Name | Expressions |
| validate(.*)button check(.*)button compare(.*)text(.*)button compare(.*)content(.*)button | contains startswith endswith | Contains Part of Starts with Begin with From begin Ends with Last part |

As illustrated in TABLE 1, the parameters 238 of this exemplary action comprise name and value, the regular expressions 242 are validate (.*) button, check (.*) button, compare (.*) text (.*) button, and compare (.*) content (.*) button, the instruction names and expressions are contains: contains and part of; startswith: starts with, begin with, and from begin; and endswith: ends with and last part. The test case generator processes the below commands based on the declarations and expressions of TABLE 1: Validate text of button "Button1" is "Login," Compare the text of button "Button1" contains "Login," Check the content of button "Button1" starts with "Log," and "Validate the content of button "Button1" ends with "gin."

Testing APIs 246 of database 114 may comprise a repository of APIs for automation testing system 110 to communicate with one or more applications or web browsers. For example, test processor 212 cannot use the same testing component 214 or testing API calls for any application or webpage, or even within the same application or webpage, because different software environments require different testing processes. Instead, test processor 212 determines the appropriate testing component 214 and API call for each action. For example, automation testing system 110 may test an application, a webpage, a third-party remote application, a spreadsheet application, any of which may be in different software environments. According to an embodiment, test processor 212 may invoke testing components 214 using testing APIs 246 of automation testing system 110. Additionally, embodiments may also include parallel execution of tests of, for example, applications and webpages, by multi-threading.

Embodiments provide for an improvement in existing computer technology, specifically, simplifying and improving flexibility and deployment associated with the prior techniques of test case processing. In addition, this dramatically reduces the time, expense, and needed resources associated with prior techniques for generating and running automation testing, which, among other things, reduces database and browser access, reduces time spent accessing a database in computer browser processing operations, and increases the speed of computer 190 and browser processing operation, which reduces computational run time of a computer. Embodiments of automation testing system 110 may create significant value proposition in terms of hardware reductions and cycle time reductions.

Figure 3:
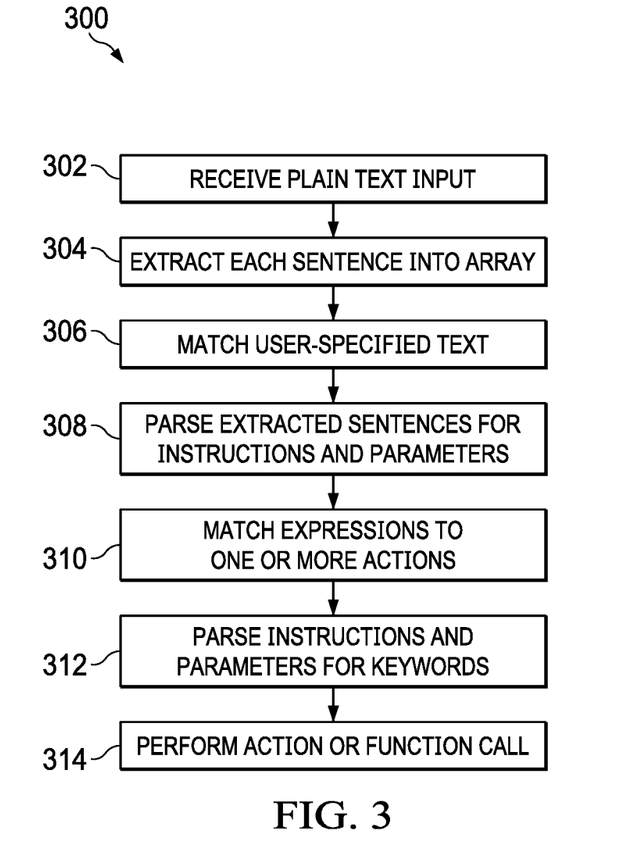
FIG. 3 illustrates a method of generating a test case from a plain text input, in accordance with an embodiment.

FIG. 3 illustrates method 300 of generating test cases from plain text input, in accordance with an embodiment. Method 300 proceeds by one or more activities, which although described in a particular order, may be performed in one or more permutations, according to particular needs.

According to an embodiment, method 300 begins at activity 302 where test case generator 224 of automation testing system 110 receives one or more test cases. According to an embodiment, test case generator 224 receives one or more test cases in plain English text as an input from one or more users via user interface 222. Each test case may comprise one or more steps and/or actions. By way of further explanation and not by way of limitation, an example is now given in connection with an exemplary embodiment comprising a user writing a test case to perform automation testing on a program or website containing one or more user-selectable elements. Continuing with this example, the user may want to test a program or webpage comprising testing the following user-selectable elements in a particular order: select a term from a menu, click a button, and click a save button. Although the exemplary embodiment is described as testing selection of a term from a menu, clicking a button and clicking a save button, test case generator 224 tests a program or webpage comprising any number of testable elements including one or more a user-selectable or user-interactive elements such as, for example, radio buttons, checkboxes, links, labels, any visible webpage element, and the like.

By way of illustration only and not by way of limitation, an example is given in connection with method 300 wherein the test case file comprises the following three sentences: "Select a term from a menu." "Click a button." "Click on save button." Although the exemplary test case file is described as comprising three sentences, embodiments contemplate test case files having any number of one or more sentences.

At activity 304, test case generator 224 extracts one or more sentences from the one or more received test cases. For example, test case generator 224 extracts each sentence into an array. For example, test case generator 224 identifies the separation between each sentence and creates a list of separate sentences wherein each sentence corresponds to a different action. Continuing with this example, the first sentence comprises "Select a term from a menu," the second sentence comprises is "Click a button" and the third sentence comprises "Click on save button." Each one of the sentences may correspond to a particular action.

Activity 306 provides for user specific acronyms and references which may be predetermined or added by one or more users, according to particular needs. At activity 308, test case generator 224 parses each sentence to extract parameters 238 and instructions 236. Parameters 238 in each sentence comprise, for example, a field name, field values, and the like, and may be enclosed by, for example, single or double quotes. For example, for each action may comprise a target, which may be expressed by parameters 238 or by an instructions 236. For example, continuing with the example described above comprising the sentence "Click a button", the term "button" is the target and the term "click" is the action. Although three particular actions are described in this example, embodiments support actions for other types of automation testing and any number of actions, according to particular needs. According to embodiments, test case generator 224 may perform one or more repetitions or iterations of analyzing the sentences from the array and/or test case file to determine values for parameters 238 and instructions 236 including, for example, particular actions, and the targets of those actions.

At activity 310, test case generator 224 matches regular expressions 242 of each action, and when a match is identified, test case generator 224 determines the action, using actions repository 242.

Figure 4:
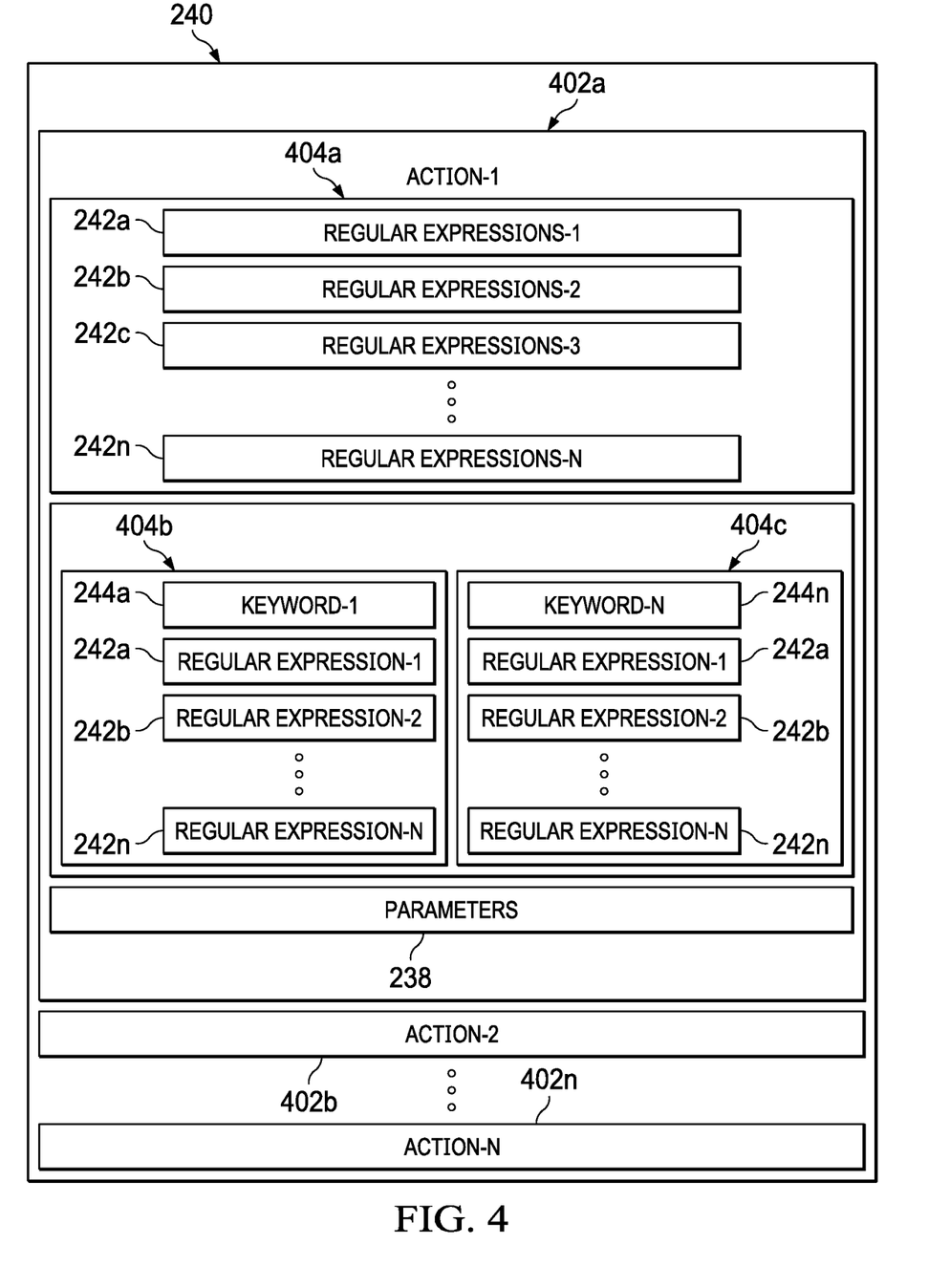
FIG. 4 illustrates an action repository, in accordance with an embodiment.

FIG. 4 illustrates action repository 240, in accordance with an embodiment. In this example, each of the one or more actions 402a-402n (e.g. Action 1, Action 2, Action N) comprises a set of regular expressions 404a-404n, which includes one or more regular expressions 242a-242n (e.g. Regular Expression 1. Through Regular Expressions N) and/or one or more keywords 244a-244n (e.g. Keyword 1 through Keyword N)). Additionally, each of the one or more actions 402a-402n may comprise parameters 238. Although each of one or more actions 402a-402n is illustrated with a particular number of regular expressions 242, 404a-404n, keywords 244a-244n, and parameters 238, embodiments contemplate each action be associated with any number of regular expressions 242, 404a-404n, keywords 244a-244n, and parameters 238, according to particular needs. According to embodiments and based on the regular expressions 242, test case generator 224 matches a particular action of actions repository 240. In addition, test case generator 224 may extract keywords 244a-244n from instructions 236 and actions 402a-402n.

At action 312, test case generator 224 may parse instructions 236 and parameters 238 for keywords 244 that are associated with one or more regular expressions 242. For example, when test case generator 224 matches regular expressions 242 of more than one action, test case generator 224 may initially ignore the given expressions or commands. According to embodiments, when two or more actions comprise similar regular expressions 242, test case generator 224 selects an action based on matching keywords 244. In the following exemplary embodiment described below, test case generator 224 matches regular expressions 242 to two actions. Continuing with this example, a first action comprises "click on regular button" and a second action comprises "click on an image button." Regular expressions 242 may be declared for each action as follows:

TABLE 2

| Action1: Click on regular button | Action2: Click on image button |
|---|---|
| Click(.*)button | Click(.*)Image(.*)button |
| Navigate(.*) button | Navigate(.*)Image(.*)button |
| NOT INCLUDED Expressions | |
| Image | |
| icon | |

As illustrated in TABLE 2, Action1 comprising "Click on regular button" is identified by the regular expressions 242 Click (.*) button and Navigate (.*) button, but only when the regular expressions 242 do not include the keywords 244 "image" and "icon." Action2 comprises "Click on image button" and is identified by the regular expressions 242 Click (.*) Image (.*) button and Navigate (.*) Image (.*) button. As shown above, when the extracted language comprises "Click on image button", this language matches the regular expressions 242 of both Action1 and Action2. However, the keywords 244 image and icon are identified as NOT INCLUDED expressions of Action1. Accordingly, when test case generator 224 matches more than one regular expression, test case generator 224 may further look for keywords 244 that must be included or must be excluded from the regular expression. Test case generator 224 may then parse the command for keywords 244, and when identified, match the command to the action that includes or does not include the keywords 244, as indicated in the action repository 240. For example, when the desired action for "Click on image button" is different than "Click on regular button", test case generator 224 may include "image" and "icon" as NOT INCLUDED keywords 244 of Action1. In this example, when the command includes "image" or "icon", test case generator 224 will identify Action2 as the selected action.

At activity 314, test case generator 224 executes the actions or function call be performed on an application, webpage, a server, a system or the like. For example, test case generator 224 may create a test case that causes automation testing system 110 to execute one or more actions or function calls on a system local to, or remote from, server 112, to validate, test, or check the performance of one or more system of supply chain network 100.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method of automatically generating test cases for automation testing, comprising:
   providing, by a server, a user interface for receiving input data written in plain text;
   receiving the input data written in plain text as input from one or more users, the input data comprising one or more sentences;
   translating, by the server, the input data into a test case;
   extracting one or more sentences and storing each sentence into an array of a database;
   extracting parameters and instructions from the one or more sentences;
   determining if there are regular expressions of the input data and actions to be performed on a browser stored in the database and matching the regular expressions with the actions;
   determining a match between an action of the actions and a single regular expression based on identifying keywords that must be included;
   determining a match between an action of the actions and a single regular expression based on identifying keywords that must be excluded;
   calling one or more testing APIs based on the determined matches;
   testing one or more action types identifying one or more user interactions with one or more applications;
   executing the test case by using the one or more user interactions identified and automatically invoking one or more testing components configured to execute a test using the actions, wherein at least one of the one or more testing components executes performance testing and at least one of the one or more testing components executes regression testing, wherein the regression testing comprises a number of threads to be used; and
   repeating execution of the test case until all errors are removed from the browser.

2. The computer-implemented method of claim 1, wherein each action is a set of operations to be performed on the browser.

3. The computer-implemented method of claim 2, wherein the set of operations to be performed on the browser is selected from the group consisting of clicking on an element, getting text of an element, matching a table row, and performing database operations.

4. The computer-implemented method of claim 1, further comprising: testing one or more action types identifying one or more user interactions with one or more webpages.

5. A system of automatically generating test cases for automation testing, comprising:
   a server, comprising a processor, memory, and one or more testing components; and
   a database, communicatively coupled with the server, and comprising one or more testing application programming interfaces; wherein the server is configured to:
   provide a user interface for receiving input data written in plain text;
   receive the input data written in plain text as input from one or more users, the input data comprising one or more sentences;
   translate the input data into a test case;
   extract one or more sentences and storing each sentence into an array of a database;
   extract parameters and instructions from the one or more sentences;
   determine if there are regular expressions of the input data and actions to be performed on a browser stored in the database and matching the regular expressions with the actions; determine a match between an action of the actions and a single regular expression based on identifying keywords that must be included;
   determine a match between an action of the actions and a single regular expression based on identifying keywords that must be excluded;
   call one or more testing APIs based on the determined matches;
   test one or more action types identifying one or more user interactions with one or more applications;
   execute the test case by using the one or more user interactions identified and automatically invoking one or more testing components configured to execute a test using the actions, wherein at least one of the one or more testing components executes performance testing and at least one of the one or more testing components executes regression testing, wherein the regression testing comprises a number of threads to be used; and repeat execution of the test case until all errors are removed from the browser.

6. The system of claim 5, wherein each action is a set of operations to be performed on the browser.

7. The system of claim 6, wherein the set of operations to be performed on the browser is selected from the group consisting of clicking on an element, getting text of an element, matching a table row, and performing database operations.

8. The system of claim 5, wherein the server is further configured to: test one or more action types identifying one or more user interactions with one or more webpages.

9. A non-transitory computer-readable medium embodied with software, the software when executed configured to:

provide a user interface for receiving input data written in plain text;

receive the input data written in plain text as input from one or more users, the input data comprising one or more sentences;

translate the input data into a test case;

extract one or more sentences and storing each sentence into an array of a database;

extract parameters and instructions from the one or more sentences;

determine if there are regular expressions of the input data and actions to be performed on a browser stored in the database and matching the regular expressions with the actions;

determine a match between an action of the actions and a single regular expression based on identifying keywords that must be included;

determine a match between an action of the actions and a single regular expression based on identifying keywords that must be excluded;

call one or more testing APIs based on the determined matches;

test one or more action types identifying one or more user interactions with one or more applications;

execute the test case by using the one or more user interactions identified and automatically invoking one or more testing components configured to execute a test using the actions, wherein at least one of the one or more testing components executes performance testing and at least one of the one or more testing components executes regression testing, wherein the regression testing comprises a number of threads to be used; and repeat execution of the test case until all errors are removed from the browser.

10. The non-transitory computer-readable medium of claim 9, wherein each action is a set of operations to be performed on the browser.

11. The non-transitory computer-readable medium of claim 10, wherein the set of operations to be performed on the browser is selected from the group consisting of clicking on an element, getting text of an element, matching a table row, and performing database operations.

\* \* \* \* \*